(12) United States Patent
Hardee et al.

(10) Patent No.: US 7,315,897 B1
(45) Date of Patent: Jan. 1, 2008

(54) ADAPTABLE CONTROL PLANE ARCHITECTURE FOR A NETWORK ELEMENT

(75) Inventors: Kevin Michael Hardee, Plano, TX (US); Michael G. Soulakis, Plano, TX (US); Thomas Wiley Hambleton, Plano, TX (US)

(73) Assignee: Alcatel Lucent, Paris (FR)

( * ) Notice: Subject to any disclaimer, the term of this patent is extended or adjusted under 35 U.S.C. 154(b) by 906 days.

(21) Appl. No.: 10/651,159

(22) Filed: Aug. 28, 2003

Related U.S. Application Data

(60) Provisional application No. 60/410,808, filed on Sep. 13, 2002.

(51) Int. Cl.
*G06F 15/16* (2006.01)
(52) U.S. Cl. .................. 709/229; 709/224; 370/231
(58) Field of Classification Search ........ 709/200–203, 709/217–234; 370/218, 230–231, 299
See application file for complete search history.

(56) References Cited

U.S. PATENT DOCUMENTS

| | | | |
|---|---|---|---|
| 5,602,839 A * | 2/1997 | Annapareddy et al. ..... | 370/405 |
| 6,851,061 B1 * | 2/2005 | Holland et al. ............... | 726/23 |
| 6,967,927 B1 * | 11/2005 | Dugeon et al. .......... | 370/236.1 |
| 7,142,507 B1 * | 11/2006 | Kurimoto et al. ........... | 370/229 |

OTHER PUBLICATIONS

Bell Labs Technical Journal "Generalized MPLS-Based Distributed Control Architecture for Automatically Switched Transport Networks", Jan.-Jun. 2001, pp. 33-49.
Elmasri and Navathe, "Fundamentals of Database Systems, 3rd Edition", pp. 629-659.

* cited by examiner

*Primary Examiner*—Moustafa Meky
(74) *Attorney, Agent, or Firm*—Carstens, Yee & Cahoon, LLP; Jessica W. Smith

(57) ABSTRACT

A method, computer program product, and data processing system for distributed control of network elements is disclosed. The present invention divides the control plane functions of a network element into subsystems, which are implemented as processes or threads. A bus-like messaging framework allows the subsystems to communicate with each other. Under the messaging framework, subsystems can communicate with each other without regard for whether the subsystems reside on separate (possibly heterogeneous) hardware platforms or on the same processor. This architecture allows individual components of the control plane functions of a single network element to be placed on different processors or on the same processor, depending on the desired degree of parallel processing or level of integration with low-level network-element hardware.

41 Claims, 11 Drawing Sheets

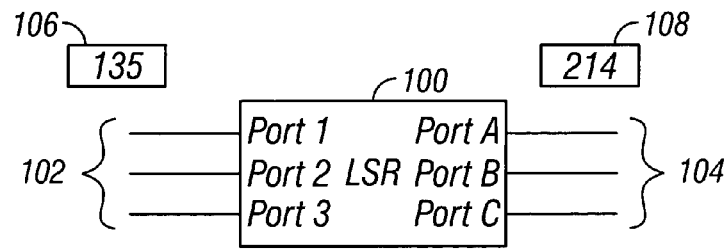
FIG. 1A
*(Prior Art)*
FIG. 1B
*(Prior Art)*
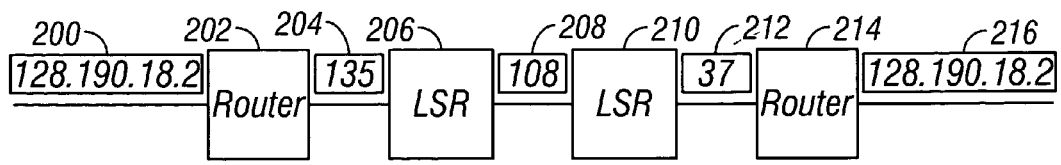
FIG. 2
*(Prior Art)*

ADAPTABLE CONTROL PLANE ARCHITECTURE FOR A NETWORK ELEMENT

CROSS REFERENCE TO RELATED APPLICATIONS

This application claims the benefit of the filing date of corresponding U.S. Provisional Patent Application No. 60/410,808, entitled "GMPLS Routing Engine," filed Sep. 13, 2002.

BACKGROUND OF THE INVENTION

1. Technical Field

The present invention is related to control software for network elements. Specifically, the present invention provides a method, a computer program product, and a data processing system for platform-independent, adaptable control of a network element.

2. Description of Related Art

Modern telecommunications depends on networks. A network is a set of interconnected machines (network elements) that allow data to be relayed across the set of machines from a source to a destination. As the need for faster and more versatile telecommunications has increased, networks have evolved to accommodate that need. The automatically-switched telephone system replaced early manual switchboards. Digital telephony replaced analog telephony. Data networks allowed binary data to be transmitted as well as sound. Now optical and wireless networks provide users with greater speed, flexibility, and mobility in telecommunications than ever before.

As telecommunications needs continue to increase, faster, more flexible, and more reliable network infrastructure is needed. Current-technology circuit-switched optical networks, for example, utilize centralized control systems for establishing and terminate routing paths in the network. In other words, a central control system determines the series of network elements that will relay information from the source to the destination for a given network connection. These centrally-controlled networks suffer from performance and reliability problems. Central control creates a single point of failure and puts an inordinate amount of workload on the central control system when many connections must be established and terminated.

Generalized Multi-Protocol Label Switching (GMPLS) is a promising solution to the problem of centralized control. The GMPLS concept is to control network routing in a distributed fashion through the use of label switching and signaling. FIGS. 1A, 1B, and 2 demonstrate how label switching works. Label switching router (LSR) 100 is a network element in a network. LSR 100 receives information 106 via one of input ports 102. Information 106 contains a label (in this case the number "135") that tells LSR 100 how to route information 106.

To identify how to route information 106, LSR 100 consults a next hop forwarding table stored in its memory. FIG. 1B is a diagram of such a next-hop forwarding table. LSR 100 locates the entry in the table corresponding to the input port 110 and label 112 of information 106. That entry maps input port 110 and label 112 into the correct output port 114 and output label 116. To route information 106 to the next network element, the label on information 106 is then changed to the output label indicated in the table and the newly labeled information (information 108 in FIG. 1A) is then output on the appropriate output port as determined by the table.

FIG. 2 is a diagram providing a more extensive example of label switching. An Internet Protocol (IP) packet 200 addressed to IP address "128.190.18.2" is forwarded from a sending computer system to ingress router 202. Router 202 calculates a route through routers 206, 210, and 214 to the destination. Router 202 communicates this switching information using a signaling protocol to routers 206, 210, and 214, which update their forwarding tables accordingly. Router 202 then affixes a label "135" to packet 200 to obtain labeled packet 204, which it forwards to the next router in the route, LSR 206. LSR 206 uses its routing table to determine the proper output port and label to use when forwarding labeled packet 204. LSR 206 then swaps the label "135" for the new label "108" from the routing table and transmits the resulting packet (packet 208) out the proper output port to LSR 210. LSR 210 swaps labels according to its routing table to obtain packet 212, which it forwards along the appropriate output port to router 214. Router 214, then detaches the label to obtain packet 216, which is a copy of original IP packet 200. Router 214 forwards packet 216 to its ultimate destination according to the IP address of packet 216.

In GMPLS, the label need not be a number, but could be any sort of distinguishing information. For example, in an optical network, information that is transmitted on a certain wavelength of light could be "labeled" by the wavelength of light used, so that different signals at different wavelengths traveling along the same optical fiber would have different "labels." This is called "wavelength-division multiplexing" (WDM). Analogously, in a wireless network, different frequencies or ranges of frequencies may be considered different "labels" for data. Time-divisioned multiplexing in which each timeslot represents a different "label" can also provide a form of labeling. Label switching, then, can allow information to be switched or routed very quickly, as there is no need to actually read or decode the information being routed. GMPLS augments centralized control by utilizing the concept of a "control plane" in which network elements cooperate in establishing and terminating connections. When a connection in a GMPLS network is to be established, the GMPLS network element that first receives a request to make a connection (the ingress router) calculates a route through the network. The ingress router then communicates this route information to the network elements in the route to allow the network elements to make adjustments to their switching fabric, called a cross connect, to allow the label-switched routing of information along the newly-established route. This process of communicating the route information is known as "signaling," and there are "signaling protocols" through which this signaling communication occurs.

Thus, in GMPLS, the responsibility for determining, establishing, and terminating routes is shared among the network elements. This is beneficial from a performance standpoint as well as from a standpoint of reliability, because there is no centralized control system to act as a performance bottleneck or single point of failure.

A distributed control system, such as provided by GMPLS, implies that each individual network element must be capable of handling a significant computational load, since each network element must provide at least a portion of the control functions of the network. As network demands increase, therefore, it is desirable that control plane functions provided by each network element be scalable, so that the computing power of a network element may be matched to the computational demands placed upon it. It would also be beneficial for a network element to be adaptable and for its control software to be platform-independent, to preserve compatibility among network elements, while allowing the administrator of the network element to vary the hardware platform to meet dynamic needs.

SUMMARY OF THE INVENTION

The present invention provides a method, computer program product, and data processing system for distributed control of network elements in a manner that is scalable, adaptable, and platform-independent. The present invention divides the control plane functions of a network element into subsystems, which are implemented as processes or threads. A bus-like messaging framework allows the subsystems to communicate with each other. Under the messaging framework, subsystems can communicate with each other without regard for whether the subsystems reside on separate (possibly heterogeneous) hardware platforms or on the same processor. This architecture allows individual components of the control plane functions of a single network element to be placed on different processors or on the same processor, depending on the desired degree of parallel processing or level of integration with low-level network-element hardware. Thus, the design of the present invention allows a system designer to scale the computational power of a network element to meet current needs, adapt disparate computing platforms to work together to control a single network element, and ensure compatibility of the control plane features of network elements with disparate hardware platforms.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A is a diagram of a label-switching router as known in the art;

FIG. 1B is a diagram of a routing table for label switching as known in the art;

FIG. 2 is a diagram of a routing path through a network in which data is routed through the use of label-switching as known in the art;

DETAILED DESCRIPTION OF THE INVENTION

Figure 3A:
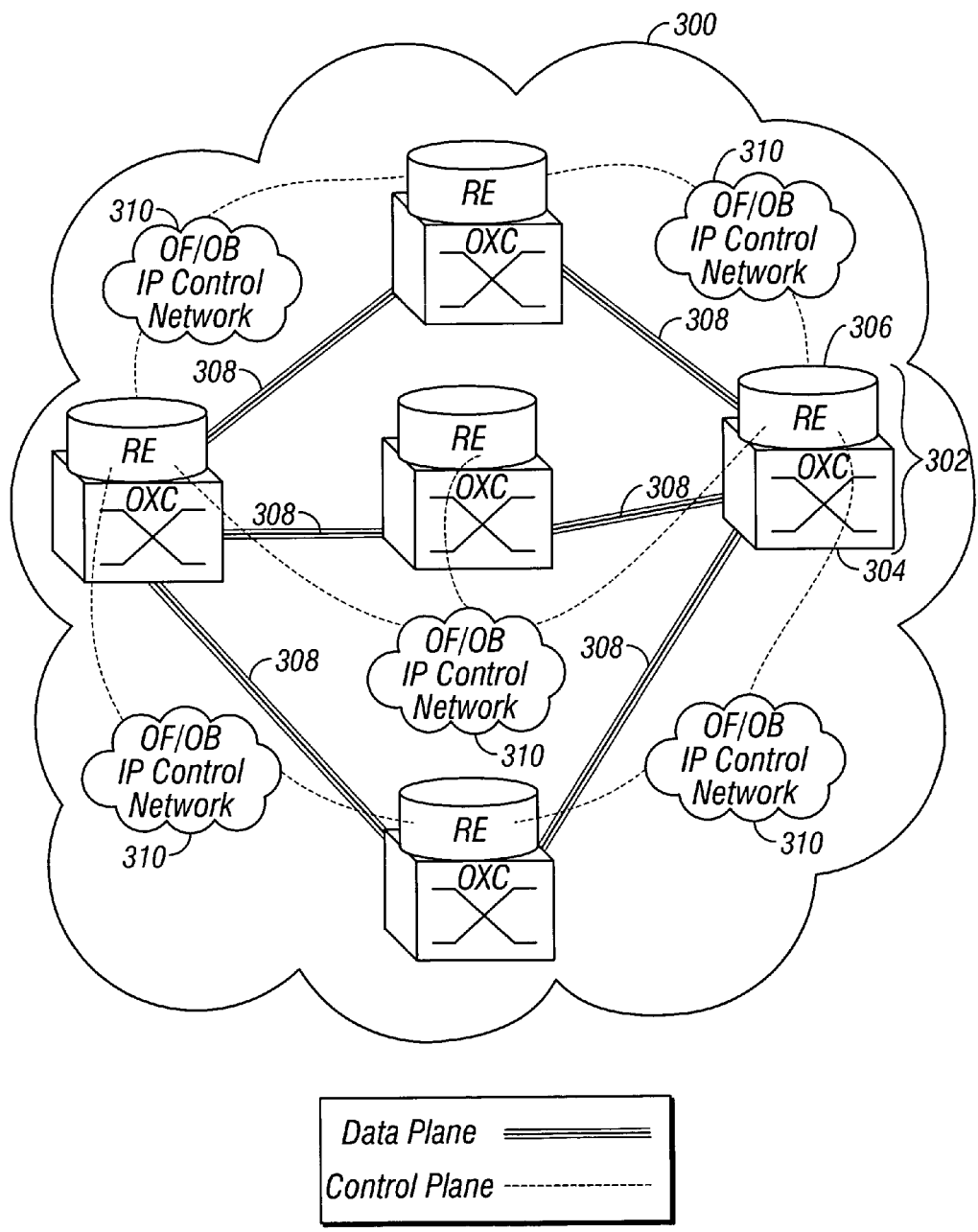
FIG. 3A is a diagram of a network made in accordance with a preferred embodiment of the present invention.

FIG. 3A is diagram of a network made in accordance with the preferred embodiment of the present invention. Network 300 is made up of a number of network elements, such as network element 302. Each of the network elements includes a transport network element 304 (which, in this case, is an optical cross connect (OXC)) and Routing Engine software 306. Optical cross connect 304 allows incoming data from optical data links to be switched to outgoing optical data links. Thus, optical cross connect 304 allows for circuit switching of optical data signals. One of ordinary skill in the art will recognize, however, that the teachings of the present invention are not limited to optical networks or optical cross-connects, but may be applied to any form physical form of network or cross-connect, including digital cross-connects (DXCs).

Routing Engine software 306 provides control functions to network element 302. In particular, Routing Engine 306 is responsible for routing path calculation, connection establishment and termination, network and equipment management functions, and fault tolerance. Network 300 is, according to a preferred embodiment, a generalized multi-protocol label-switching (GMPLS) network utilizing time-division multiplexing. In accordance with the GMPLS concept, Routing Engine 306 and the Routing Engine software associated with the other network elements in network 300 form a control plane. That is, the Routing Engine software associated with the network elements in network 300 work in a distributed fashion to control network plane 300. Thus, the terms "Routing Engine," "Routing Engine software," and "network element control software" are used interchangeably throughout this specification. While data is transmitted between the network elements, which make up a "data plane" (also referred to as a "transport plane"), the Routing Engine software associated with each of the network elements in network 300 relies on an out-of-fiber/out-of-band Internet Protocol (IP) control network (IP Control Network 310). One of ordinary skill in the art will recognize that any form of data communication network (DCN) may be used for IP Control Network 310, including out-of-fiber/out-of-band (OF/OB), in-fiber/in-band (IF/IB) and in-fiber/out-of-band (IF/OB) DCNs. Because GMPLS allows the communication links for the control plane to be physically separate from the communication link for the data plane, network 300 uses IP Control Network 310 for inter-Routing Engine communications. The terms out-of-fiber and out-of-band refer to the fact that OF/OB IP Control Network 310 is physically separated from the data links 308, which in an optical network would be optical fibers. In-fiber/in-band (IF/IB) means that the control signals in the IF/IB network are transmitted along with the data. In-fiber/out-of-band would refer to a situation in which the same physical medium is used for data and control signals, but the control and data signals are separated, by using different wavelengths of light or frequencies of electrical signals, for example. Internet Protocol refers to the international standard Internet Protocol (IP), which makes up part of the TCP/IP (Transmission Control Protocol/Internet Protocol) suite of networking protocols, which are widely known in the art. IP is defined in RFC (Request for Comments) 791, which is a standards document maintained by and available from the Internet Engineering Task Force (IETF), an international standards-setting body for Internet-based networking.

Figure 3B:
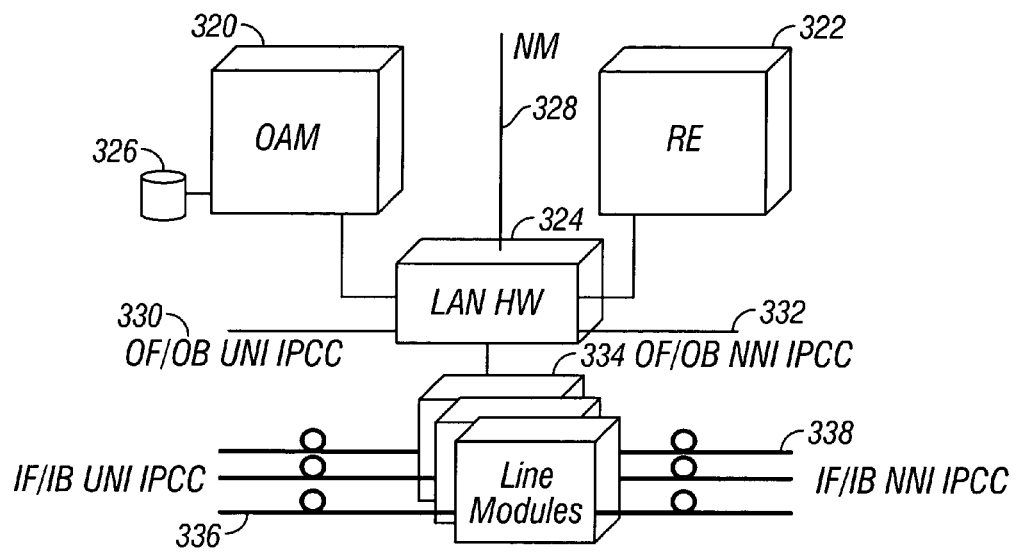
FIG. 3B is a diagram of an exemplary hardware platform used in conjunction with a preferred embodiment of the present invention.

FIG. 3B is a diagram depicting a more detailed representation of the hardware used in a network element in accordance with a preferred embodiment of the present invention. FIG. 3B may represent network element 302 in FIG. 3A, for instance. The network element in FIG. 3B includes two processors: operation and administration manager (OAM) processor 320 and Routing Engine (RE) processor 322. In the embodiment depicted in FIG. 3B, Routing Engine software 306 from FIG. 3A is distributed across OAM processor 320 and RE processor 322.

OAM processor 320 contains subsystems of Routing Engine software 306 that deal primarily with network management and equipment management issues. OAM processor 320 also has attached storage 326 for storing persistent data. RE processor 322 contains subsystems that primarily deal with the routing, establishment, and termination of connections in the network. OAM processor 320 and RE processor 322 communicate with each other by way of local area network (LAN) hardware 324. Thus, a single network element such as the one depicted in FIG. 3B is, in accordance with a preferred embodiment of the present invention, a small network unto itself. LAN hardware 324 may be managed using conventional network management protocols such as the well-known standard Simple Management Network Protocol (SNMP), as represented by network management communication 328 in FIG. 3B. SNMP is defined in RFC 1157 from the IETF.

Although two processors are depicted in FIG. 3B, the software subsystems making up Routing Engine software 306 in FIG. 3A may be distributed across any number of processors. This allows the computational power of a network element to be scaled to meet current needs. Also, the teachings of the present invention allow for different processors and different platforms to be used together in a distributed fashion to realize the control functions of a single network element. Thus, a network element in accordance with the present invention is not only scalable, but adaptable in the sense that various hardware and system software platforms (e.g., different processors and operating systems) may be used together within a single network element.

Returning now to FIG. 3B, control-channel-specific LAN hardware 324 also allows for the transfer of control information between network elements (e.g., via IP Control Network 310 in FIG. 3A). FIG. 3B depicts two out-of-fiber/out-of-band IP Control Channels 330 and 332. An IP Control Channel (IPCC) is a set of one or more communication links between network elements that allow control information to be passed between the network elements using Internet Protocol (IP). In FIG. 3B, the two IPCCs depicted, UNI IPCC 330 and NNI IPCC 332, use different protocols to communicate control information between network elements. UNI (User-Network Interface) and NNI (Network-Node Interface) are a set of standard protocols used for passing control information between network elements, but each is adapted to a slightly different use. NNI (more specifically, I-NNI, Internal-NNI) is used to pass control information between network elements within a single-vendor transport network, which may be a sub-network of a larger multi-vendor/domain network. UNI, on the other hand, is used to pass control information between a client and a transport network. UNI and I-NNI are standards of the Optical Internetworking Forum (OIF), an industrial standards-setting organization.

LAN hardware 324 also communicates with line modules 334, which provide optical networking capabilities to the primary data links in the network. As can also be seen from FIG. 3B, line modules 334 may support the transmission and reception of in-fiber/in-band IP Control Channel Signals. FIG. 3B depicts an in-fiber/in-band UNI IPCC 336 and an IF/IB NNI IPCC 338, which are the in-fiber/in-band (IF/IB) analogs of OF/OB UNI IPCC 330 and OF/OB NNI IPCC 332.

Figure 4A:
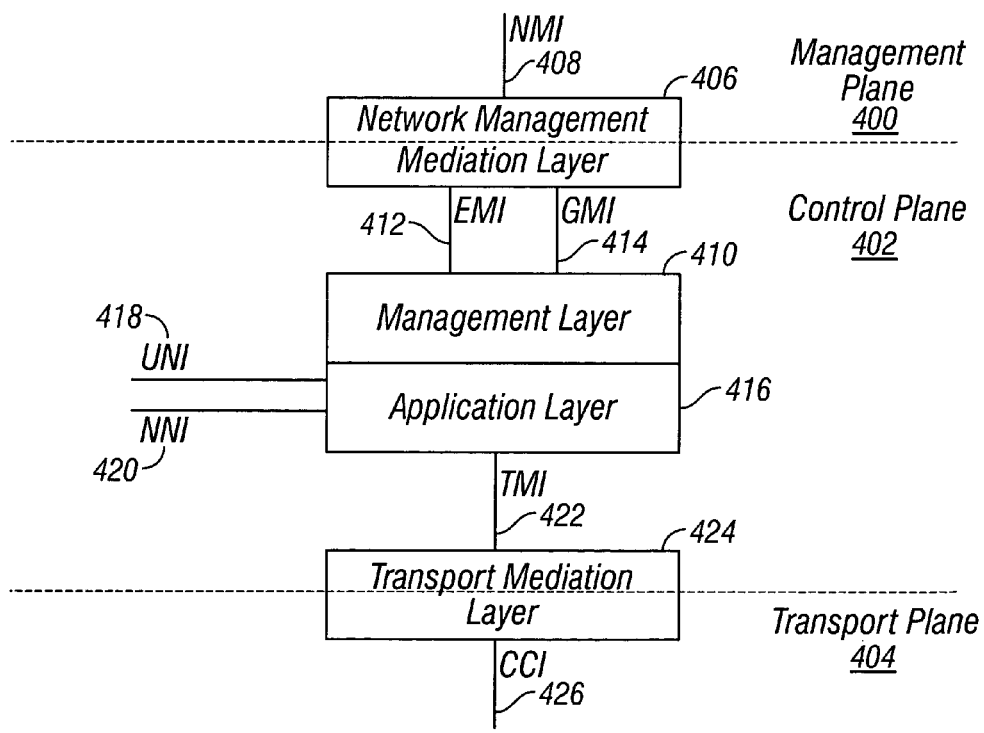
FIG. 4A is a high-level diagram of a software architecture in accordance with a preferred embodiment of the present invention.

We will now focus our attention on the software architecture of Routing Engine software, such as Routing Engine software 306 in FIG. 3A. FIG. 4A is a diagram providing a high level architectural view of Routing Engine software in accordance with a preferred embodiment of the present invention. It should be noted at this point that although the preferred embodiment of the present invention depicted in the following Figures is based largely upon a GMPLS networking model, one of ordinary skill in the art will recognize that the teachings of the present invention may be applied to any of a number of networking technologies. The present invention is not limited to GMPLS technology. For example, an embodiment of the present invention may be implemented in an ASON (Automatically Switched Optical Network) or ASTN (Automatically Switched Transport Network).

Returning now to FIG. 4A, the functions of a network element can be divided into three planes of operation, a management plane 400 for performing network and equipment management activities, a control plane 402 for controlling the routing, establishment, and termination of connections, and a transport plane 404 for performing actual transport and switching of data over the connections established by control plane 402. This three-plane model is the basis for the GMPLS approach to networking, although one of ordinary skill in the art will recognize that the three-plane model applies in other networking contexts as well.

A preferred embodiment of the present invention adopts a four-layer software architecture. In an actual embodiment, the control software represented by the architectural view provided in FIG. 4A could be adapted to operate in conjunction with existing network element technology that does not contain such control plane software (e.g., network elements without routing and traffic-engineering capabilities) in order to impart such capabilities to a network element. Network management mediation layer 406 provides an adaptation interface to existing network management protocols such as the aforementioned SNMP. This network management interface is represented by network management interface (NMI) 408 in FIG. 4A.

Management layer 410 provides the basic software infrastructure for the other layers in the architecture depicted in FIG. 4A and is responsible for managing and maintaining the other layers. Management layer 410 facilitates communication between software subsystems of the control software represented by the architecture in FIG. 4A. Management layer 410 communicates with network management mediation layer 406 through an equipment management interface (EMI) 412 and a general management interface (GMI) 414. EMI 412 is an interface used to allow management layer 410 to direct network management mediation layer 406 to perform equipment management functions, such as software installation or software or hardware deployment. Management layer 410 utilizes general management interface 414 as a platform-independent protocol for exchanging network management information in any of the standard network management protocols supported by network management mediation layer 406.

Application layer 416 sits under management layer 410 and provides core network control functionalities, such as routing, signaling, link management, and fault tolerance functions. Application layer 416 also communicates with the control software of other network elements (e.g., via IP control network 310 in FIG. 3A). As shown in FIG. 4A, a preferred embodiment of the present invention may utilize UNI (UNI Interface 418) or NNI (NNI Interface 420), although one of ordinary skill in the art will recognize that other interfaces or protocols of similar application may be used without departing from the scope and spirit of the present invention.

Transport mediation layer 424 provides an interface between control software and low-level networking hardware and software. Transport mediation layer 424 controls the actual physical switching and transmission of data across the primary data links (data links 308 in FIG. 3A). A generic interface, transport mediation interface 422, allows application layer 416 to communicate with transport mediation 424, while transport mediation layer 424 handles the platform dependent aspects or network switching and data transmission. The platform dependent interface transport mediation layer 424 must use to communicate with the underlying hardware and software that controls network routing and data transmission is represented by cross connection interface (CCI) 426. In a preferred embodiment of the present invention, CCI 426 is the native interface into the network element's switch fabric used to establish cross connections. For example, in the network depicted in FIG. 3A, CCI 426 would be the interface between Routing Engine software 306 and transport network element 304.

As can be seen from FIG. 4A, the software architecture of a preferred embodiment of the present invention utilizes network management mediation layer 406 as an interface between management plane 400 and control plane 402. Likewise, transport mediation layer 424 provides an interface between control plane 402 and transport plane 404. This arrangement allows control plane 402 to operate in a platform-independent manner. This is in keeping with the design objectives of scalability, adaptability, and platform independence. Thus, control plane 402 may be tightly- or loosely-integrated with network element hardware and software. For example, the software functions provided by management layer 410 and application layer 416, which make up control plane 402, may be offloaded to a computer system that is external to the actual physical network element. On the other hand, control plane 402 could be tightly coupled with a physical network element so that management layer 410 and application layer 416 make up part of the actual control software for the physical network element itself. Also, the platform-independent nature of control plane 402 means that its software functionality can not only be offloaded onto an external computer system, but an entirely different and incompatible hardware or system-software platform can be used for realizing control plane functions than that which is used in management plane 400 or transport plane 404.

Figure 4B:
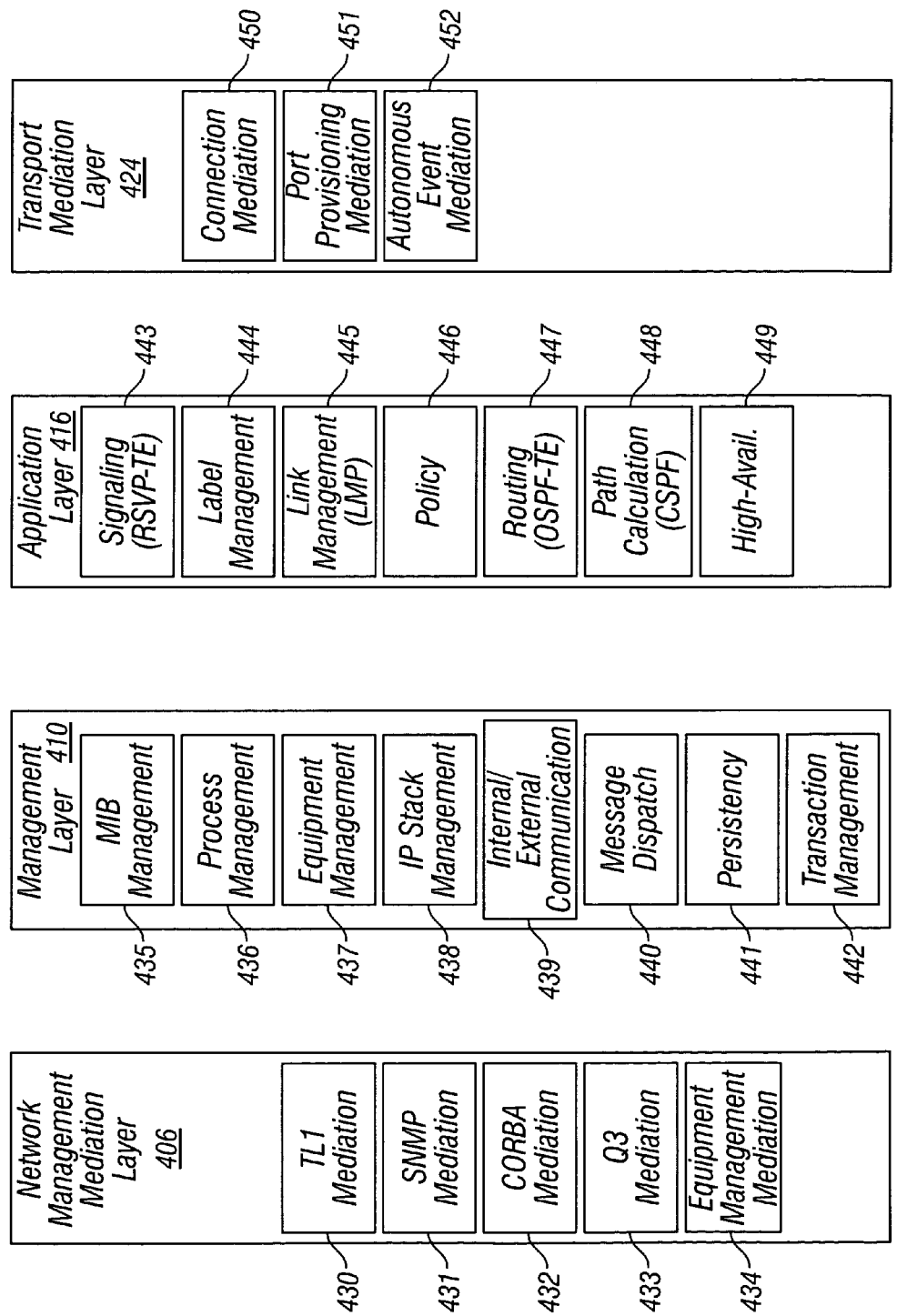
FIG. 4B is a diagram mapping functions to software architectural layers in a software architecture in accordance with a preferred embodiment of the present invention.

FIG. 4B is a diagram that maps layers in the layered architecture depicted in FIG. 4A into individual functions to be performed in association with a network element in accordance with a preferred embodiment of the present invention. Network management mediation layer 406, as shown in FIG. 4B, provides mediation with a number of standard network management protocols and object models. This allows network element control software made in accordance with the preferred embodiment of the present invention to utilize any of a number of standard network management protocols and object models. Some examples of network management protocols provided in FIG. 4B are Transaction Language 1 (TL1) 430, Simple Network Management Protocol (SNMP) 431, Common Object Request Broker Architecture (CORBA) 432, and Q3 433. TL1 is a standard defined by Telcordia Technologies, Inc. (formerly Bellcore) of Piscataway, N.J. CORBA is a standard that is defined and maintained by Object Management Group (OMG), an industry standards-setting body. Q3 is a standard of the International Telecommunication Union (ITU), an international standards-setting body, and is defined in ITU Recommendation M.3010. It should be noted that the network management protocols and object models provided for in FIG. 4B are not intended to be exhaustive and that alternative network management protocols may be utilized within an embodiment of the present invention without departing from the scope and spirit of the invention. Network management, a well-known term in the art, refers to the configuration of a network element with respect to its role on the network—in other words, the setting of network communication parameters. In particular, network management protocols allow an administrative computer system to communicate such parameters to a network element so that the actual communication parameters employed by the network element (such as the network address of the network element, for example) may be modified accordingly. Several standards have evolved regarding the parameters that may be modified through network management and the data formats in which those parameters may be expressed. MIB (Management Information Base), the second version of which is defined in the IETF's RFC 1213, is a standard regarding what parameters a network element maintains. SMI (Structure of Management Information), which is defined in the IETF's RFC 1155, is a standard defining a set of common structures and an identification scheme used to reference variables defined in the MIB.

Network management mediation layer 406 also includes functionality for interfacing with equipment management facilities of the network element (equipment management mediation function 434). Equipment management refers to the management of the software and hardware of the network element. The equipment management facilities of a network element may allow the RE to be taken in and out of service, allow equipment management features of the network element to manage RE hardware, and allow updates and diagnosis of problems to be made. Equipment management mediation function 434 cooperates with equipment management function 437 of management layer 410 (described below) to accomplish this.

Management layer 410 provides a number of different functionalities for supporting communication, persistency, and transaction management for the various software subsystems making up the four layers. MIB management function 435 represents the functionality required to maintain variables (parameters) in the Management Information Base (MIB) for the network element. It should be noted that although the MIB standard is referred to in this preferred embodiment of the present invention, one of ordinary skill in the art will recognize that the actual set of variables storing communications parameters in an actual network element may differ from the MIB standard without departing from the scope and spirit of the present invention. For example, even under IETF-promulgated standards, many MIB variations exist in order to support different networking protocols.

Process management function 436 represents the functionality required for the establishment, maintenance, and termination of software processes and threads operating as part of the Routing Engine software. Equipment management function 437 represents the functionality required for the coordination of all manual and automatic maintenance actions between Routing Engine software and the equipment management facilities of the network element. Some examples of these maintenance actions include problem diagnosis, updating of software, and bringing software and/or hardware in or out of service.

The following three functions provided by management layer 410 relate to communication between network element control software subsystems and between Routing Engine software for the local network element and Routing Engine software of other network elements. IP stack management function 438 represents the functionality for coordinating management operations with an Internet Protocol (IP) stack, which may be used for providing low-level (i.e., network level in the standard seven-layer communications model) communication between Routing Engine software for the local network element and Routing Engine software for an external network element, as well as communications between network element control software subsystems residing on separate processors. Internal/external communication function 439 represents the functionality required for supporting communication between all of the network element control software subsystems. Internal/external communication function 439 provides an abstract communication interface that allows software subsystems to communicate without regard for whether the subsystems reside in the same or different memory spaces or processors. Message dispatch function 440 represents the functionality required for routing messages from an external memory space to a recipient subsystem in a local memory space. The concepts of external and local memory spaces will be explained later in this document in conjunction with FIG. 7.

Management layer 410 also contains functionality for persistent data storage and transaction management. Persistency function 441 represents the functionality required for controlling the commitment of protocol and MIB data to persistent data storage (not all protocol-related data is stored in MIBs, in particular protocol state information is typically not stored in a MIB, but is stored by persistency function 441, nonetheless). Transaction management function 442 represents the functionality required to ensure the data is stored to persistent store in a consistent manner (transaction processing). Transaction processing is a well-known area of computing technology and many different schemes exist for performing transaction management. Transaction processing, as known in the art, is described in detail in Elmasri and Navathe, *Fundamentals of Database Systems*, $3^{rd}$ Edition, Addison-Wesley (2000), pp. 629-659 (Chapter 19), which is hereby incorporated by reference.

Application layer 416 contains functionalities associated with control plane computations and protocols. Signaling function 443 represents the functionality required to signal the creation of label-switched paths (LSPs) within the network. An example of a protocol that provides this functionality is the Reservation Protocol for Traffic Engineering (RSVP-TE). RSVP-TE is defined in the IETF's RFC 3209. Label management function 444 represents the functionality required to allocate and release labels during the creation and deletion of label-switched paths within the network. The space of available labels for allocation and release is dependent upon the switching capabilities of the underlying network element. For example, labels for a time-division multiplexed device (e.g. in a synchronous optical network or SONET) will specify time slots within the multiplexing structure while labels for a wavelength-division multiplexing device will specify wavelengths.

Link management function 445 represents the functionality required for maintaining control channel connectivity, verification of data bearing link connectivity, correlation of link property information, aggregation of data bearing links into traffic engineering (TE) links in a GMPLS context, and management of data bearing link failures. An example of a standard protocol that provides this functionality is link management protocol (LMP). The current specification for LMP is defined in the IETF's Internet Draft draft-ietf-ccamp-lmp. Policy function 446 represents the functionality required for coordinating and enforcing policy decisions when external label-switched path operations are received.

Routing function 447 represents the functionality required to support the routing needs of the IP control plane and transport or data plane. The routing needs of the IP control plane entail routing for intra-domain and inter-domain IP control packets, where a domain represents an individual transport network that may be part of a larger DCN. The routing needs of the transport or data plane entail the distribution of topology information. The topology information of the data plane is used during path calculation when setting up a label switched path to the transport network. A number of IP control plane routing protocols are available to provide this routing function. Some examples of IP control plane protocols include, but are not limited to, Routing Information Protocol (RIP) (IETF RFC 1058), Interior Gateway Protocol (IGP), Exterior Gateway Protocol (EGP), Border Gateway Protocol (BGP) (IETF RFC 1267), Open Shortest Path First (OSPF) (IETF RFC 1247), Open Shortest Path First For Traffic Engineering (OSPF-TE) (IETF Internet Draft draft-katz-yeung-ospf-traffic), and Intermediate System-Intermediate System (IS-IS) (IETF RFC 1195).

Path calculation function 448 represents the functionality required for calculating routing paths through the transport network to which the network element is connected. In a preferred embodiment of the present invention, a routing path is a label-switched path (LSP) through a label-switched network. Path calculation function 448 uses the topology information gathered in routing function 447 as a "roadmap" for calculating a path for a given connection. A number of algorithms exist for the calculation of efficient paths in a network, such as the well-known Dijkstra's shortest-path graph algorithm. Dijkstra's Algorithm and single-source shortest-path graph algorithms in general are described in Cormen, Leiserson, and Rivest, Introduction to Algorithms, MIT Press, 1990, pp. 514-532. In a preferred embodiment of the present invention, a constraint-based shortest-path first (CSPF) algorithm is used to calculate an optimized path while taking into account constraints. A number of heuristic algorithms and protocols for constrained routing exist in the art. For example, IETF Internet Draft draft-katz-yeung-ospf-traffic (October 2001), describes enhancements to the OSPF standard for supporting constraints.

Application layer 416 may also include a high availability function 449. High availability function 449 represents the functionality required for the coordination, replication, and synchronization of critical dynamic data. Should a failure in Routing Engine software or its underlying hardware occur, high availability function 449 enables a failover to a standby hardware or software system. This may be accomplished, for example, by operating redundant hardware and software systems in which one system is designated the active system. Heartbeat messages may be exchanged between the redundant systems so that if a standby system fails to receive heartbeat messages, a failover may be initiated.

Transport mediation layer 424 contains a number of functionalities related to operation of the underlying network element hardware that performs actual data switching and transfer. Connection mediation function 450 represents the functionality required for translating switching requests or cross connection requests from Routing Engine software to a format native to the underlying network element. Recall that an objective of the present invention is to allow control software to be applied to existing network element technology that lacks such software. Thus, connection mediation function 450, as well as the other functions provided by transport mediation layer 424, allow network element control plane software to interact with an underlying network element hardware. Port provisioning mediation function 451 represents the functionality required for putting new data plane resources (ports) into service or removing these resources from service. Autonomous event mediation function 452 represents the functionality required for filtering and translating autonomous events from and to the native network element format to a format recognizable to Routing Engine software. Autonomous events are system alarms such as data plane link up and link down events that cause changes in bandwidth availability, and/or trigger path restoration processing.

Figure 4C:
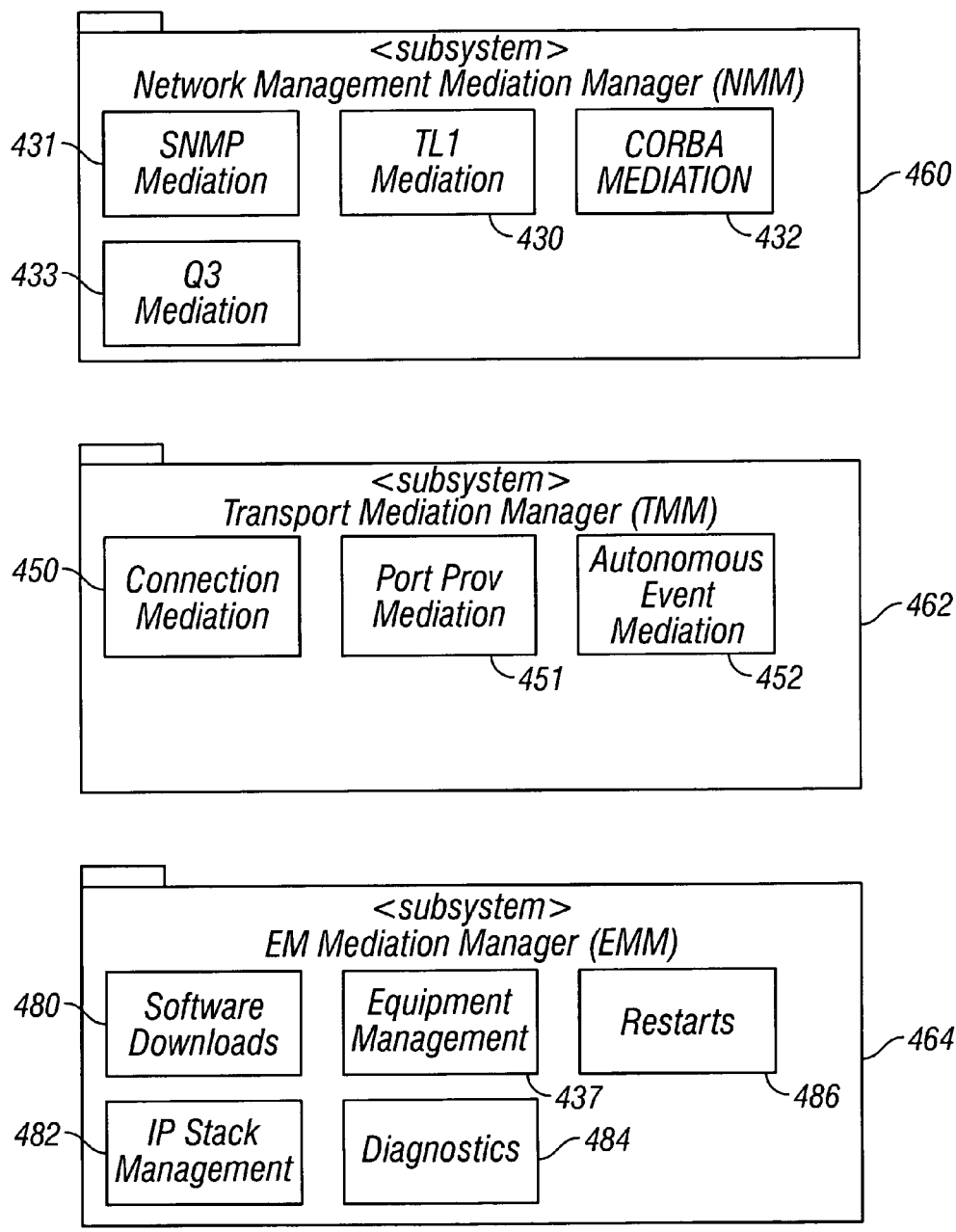
FIGS. 4C-4E are UML diagrams of software subsystems and the functions supported by those subsystems in accordance with a preferred embodiment of the present invention.
Figure 4D:
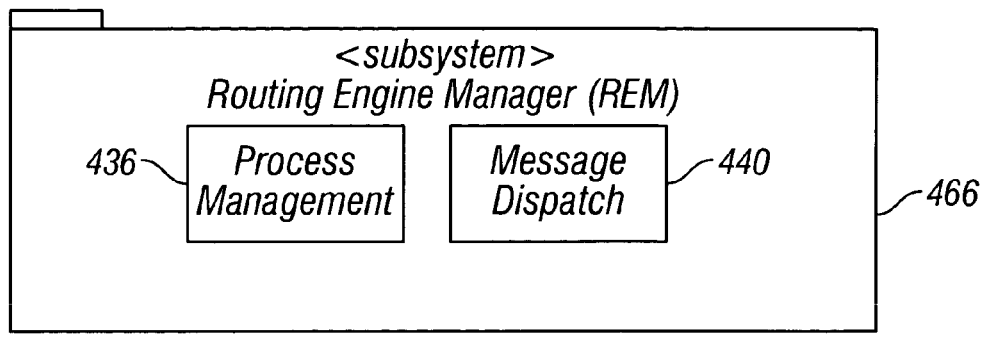
Figure 4D:
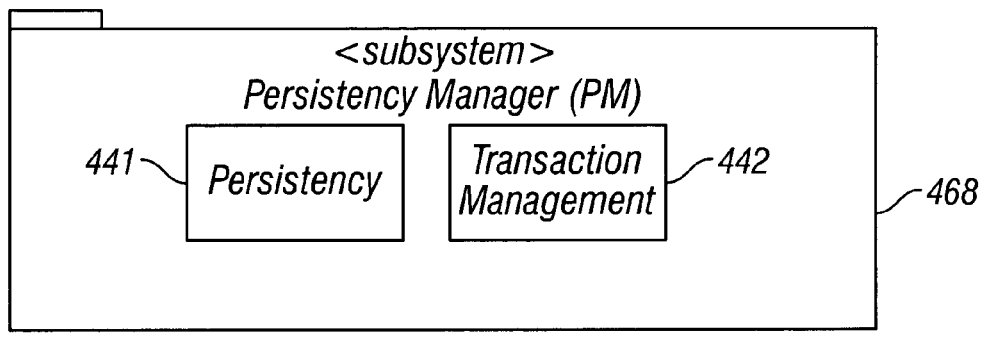
Figure 4D:
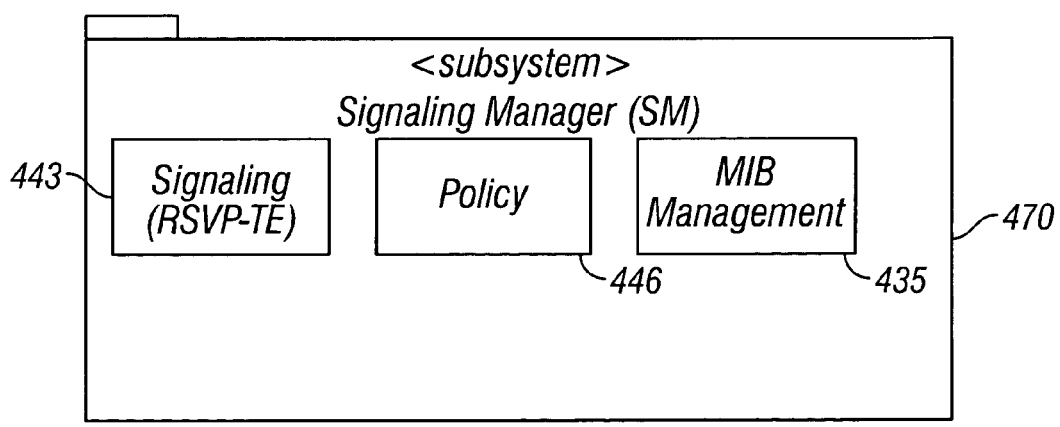
Figure 4E:
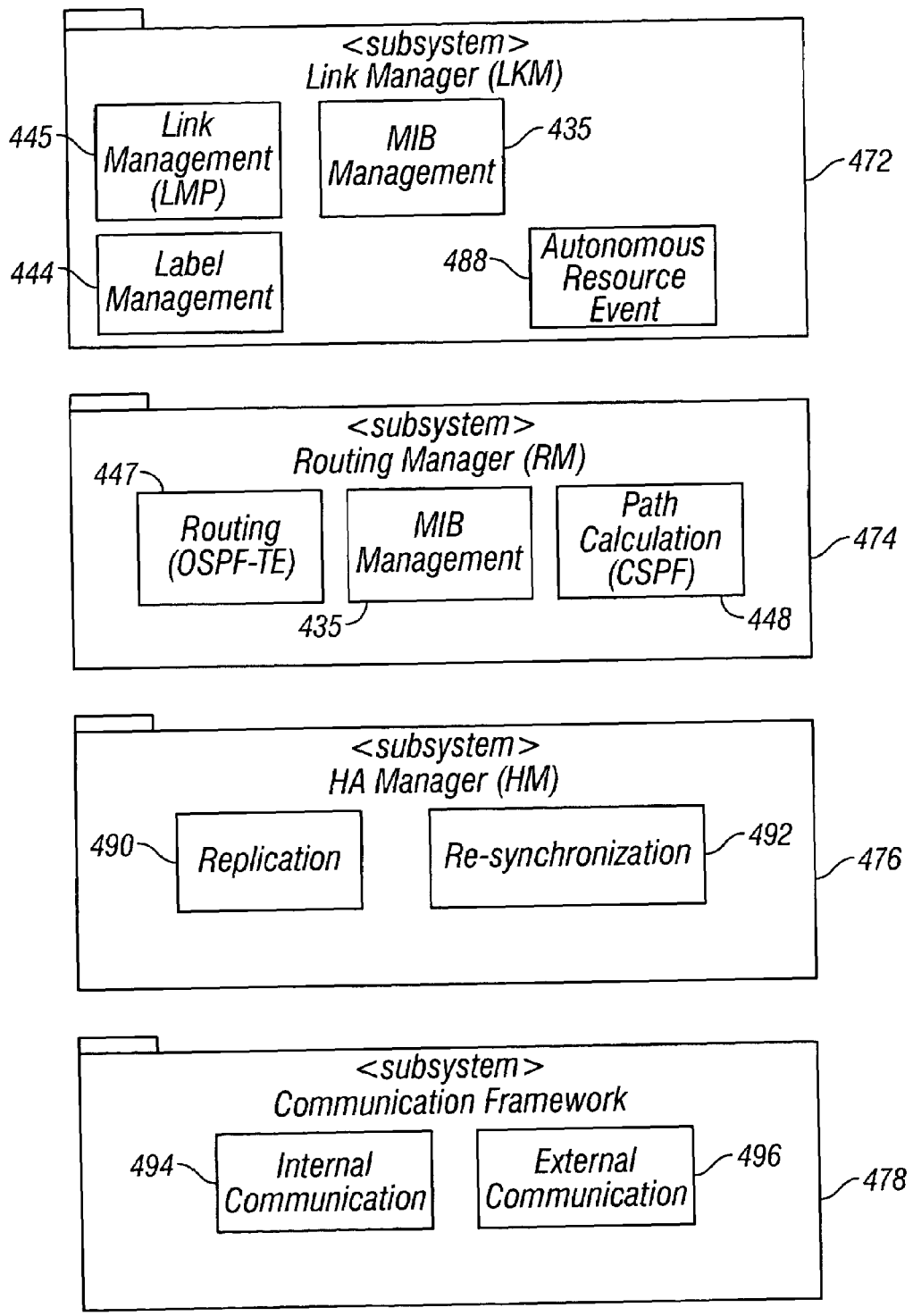

FIGS. 4C thru 4E are UML (Uniform Modeling Language) diagrams mapping the functions described in FIG. 4B with software subsystems in accordance with a preferred embodiment of the present invention. In a preferred embodiment of the present invention, each of the subsystems depicted in FIGS. 4C thru 4E, with the exception of communications framework subsystem 478, may execute as separate threads or processes (or groups of threads or processes) in a processor or group of processors. Processes are streams of instructions that execute concurrently in one or more processors. As the term is used in this document, "processes" refer to streams of instructions that execute concurrently in separate memory spaces. Threads, on the other hand, are streams of instructions that execute concurrently in a shared memory space. Because a thread does not have its own memory space, threads are also known as "lightweight processes." It should be noted that the subsystems depicted in FIGS. 4C thru 4E, although roughly segregated by layer in the four layer architecture described in FIG. 4A, there is some degree of overlap between layers in certain subsystems in this preferred embodiment.

Referring now to FIG. 4C, a network management mediation manager subsystem 460 is a thread or process that performs mediation with network management protocols and object models. Thus network management mediation manager subsystem 460 is depicted as supporting SNMP mediation function 431, TL1 mediation function 430, CORBA mediation function 432, and Q3 mediation function 433.

Transport mediation manager subsystem 462 is a thread or process that realizes the functions of the transport mediation layer described in FIGS. 4A and 4B. Thus, transport mediation manager 462 supports connection mediation function 450, port provisioning mediation function 451, and autonomous event mediation function 452.

Equipment management mediation manager subsystem 464 is a thread or process that provides equipment management functionality. Thus, equipment management mediation manager 464 supports software downloading function 480 for downloading system software and updates, IP stack management function 482, diagnostics function 484, restarting function 486 for restarting the network element and its related software, and a general equipment management function 437.

Referring now to FIG. 4D, Routing Engine manager subsystem 466 supports process management 436 and message dispatch function 440. Persistency manager subsystem 468 is a thread or process that supports persistency function 441 and transaction management function 442. Signaling manager subsystem 470 is a thread or process that supports signaling functions 443, policy function 446, MIB management function 435 (for maintaining signaling-related parameters in the MIB—in general, each protocol supported in the network element will have MIB variables).

Now referring to FIG. 4E, link manager subsystem 472 is a thread or process that supports label management function 444, link management function 445, MIB management function 435, and autonomous resource event function 488. Routing manager subsystem 474 is a thread or process that supports routing function 447, MIB management function 435, and path calculation function 448. High availability manager subsystem 476 is a thread or process that supports replication function 490, which is the replication of data to a standby system to make the standby system available for failover, and resynchronization function 492, which the functionality required to prepare a standby system for failover and to initiate the failover process.

Communication framework subsystem 478 is neither a thread nor a process, but is a component of the other subsystems, such as a class or library that is incorporated into the different subsystems. Communication framework subsystem 478 provides internal communication function 494 for facilitating communication between subsystems that exist within the same memory space and external communication function 496 for communicating with subsystems that execute in a different memory space or on a different processor. Communication between the various subsystems is important, because each subsystem depends on other subsystems to provide required functions or information. For example, Routing Engine manager subsystem 466 uses information from link manager subsystem 472 regarding the status of data links connected to the network element in order to propagate topology information to other network elements that reflects the status of those links. Likewise, routing paths calculated by Routing Engine manager subsystem 466 are signaled to other network elements in the calculated path using a signaling protocol supported by signaling manager subsystem 470.

Figure 5:
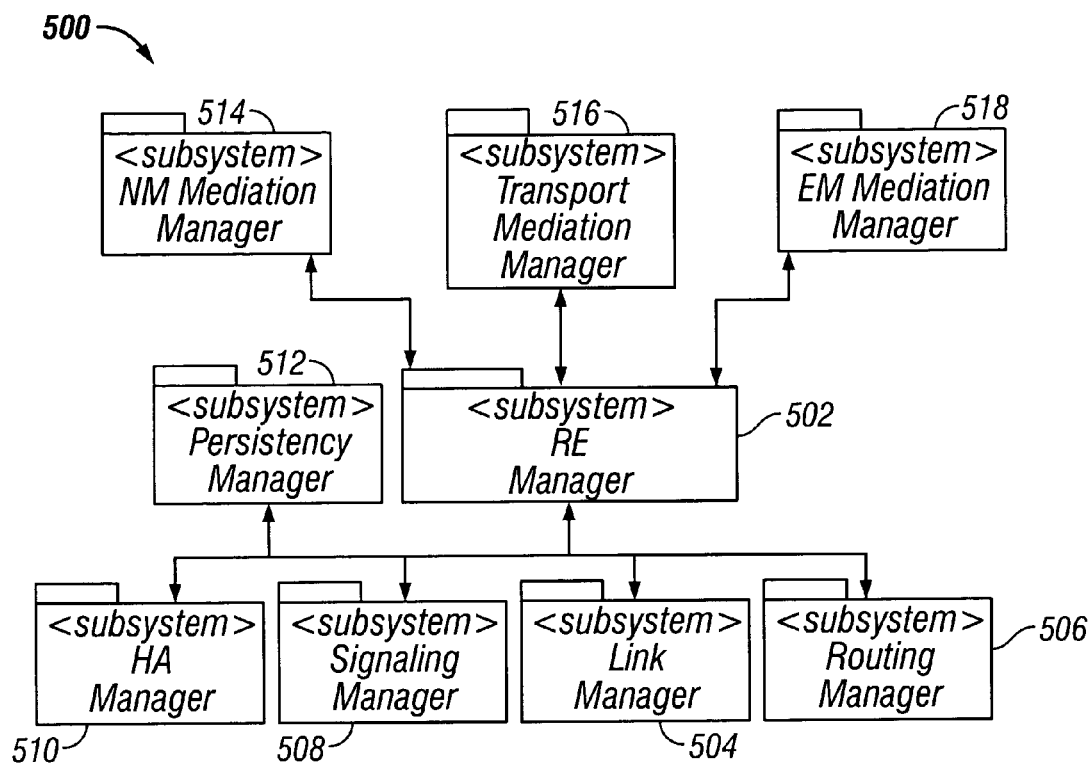
FIG. 5 is a diagram providing a relational view of software subsystems in accordance with a preferred embodiment of the present invention.

FIG. 5 is a diagram depicting the relationships between the aforementioned subsystems depicted in FIGS. 4C thru 4E. Together, the subsystems make up what has been referred to as Routing Engine software and network element control plane software in this document. We will refer to this combined software system as Routing Engine software 500. Routing Engine manager subsystem 502 is the main facilitator of communication among the subsystems in Routing Engine software 500. In a preferred embodiment, most of the subsystems providing application layer functionality will reside in the same memory space as Routing Engine manager 502. Subsystems that reside within the same memory space as Routing Engine manager 502 will be referred to as local subsystems, while subsystems that reside in a different memory space or on a different processor than Routing Engine manager 502 will be referred to as external subsystems. In a preferred embodiment, link manager subsystem 504, routing manager subsystem 506, signaling manager subsystem 508, high availability manager subsystem 510, and Routing Engine manger 502 will reside in the same memory space. Thus, these subsystems will, in a preferred embodiment, be local subsystems. In the same preferred embodiment, persistency manager subsystem 512, network management mediation manager subsystem 514, transport mediation manager subsystem 516, and equipment management mediation manager subsystem 518 will be external subsystems. Using the communication framework provided by the present invention (communication framework subsystem 478 in FIG. 4E), each of the subsystems in Routing Engine software 500 is able to communicate with any of the other subsystems without regard to whether the subsystems are local or external. This is accomplished by adopting a bus-like communications scheme for local subsystems, while using Routing Engine manager 502 as a proxy or bridge to the external subsystems. This is described in more detail in FIGS. 6 thru 11.

Figure 6:
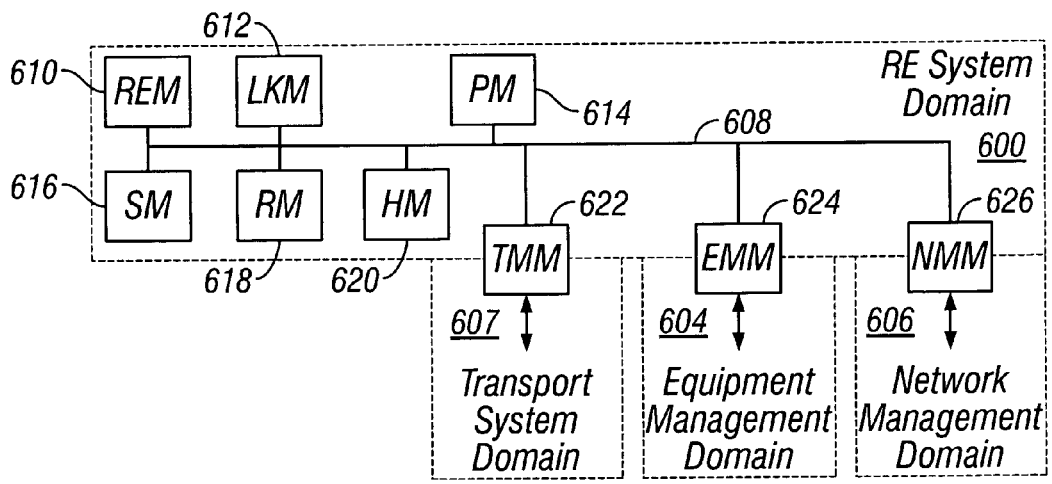
FIG. 6 is a diagram of the communication model employed in a preferred embodiment of the present invention.

FIG. 6 is a diagram of the communication model adopted by a preferred embodiment of the present invention. FIG. 6 shows that the communication space defined by this communication model is divided into four domains. Routing Engine system domain 600 is the domain in which all of the Routing Engine software subsystems reside. Transport system domain 602 represents the communication space in which the underlying network element hardware resides. Equipment management domain represents the communication space of equipment management facilities within the underlying network element. Network management domain 606 represents the communication space of network management network facilities within the underlying network element. As can be seen from FIG. 6, the communication domains roughly correspond to the three planes in the three plane network element model that forms the basis for the architectural view in FIG. 4A. Specifically, equipment management domain 604 and network management domain 606 reside in management plane 400 in FIG. 4A. Routing Engine system domain 600 corresponds to control plane 402 in FIG. 4A. Transport system domain 602 corresponds to transport plane 404 in FIG. 4A.

The communication model adopted by a preferred embodiment of the present invention uses a bus-like mechanism 608 to allow communications between software subsystems in Routing Engine system domain 600. As can be seen from FIG. 6, those subsystems that make up management layer 410 and application layer 416 in FIG. 4A (i.e., the subsystems making up control plane 402) may communicate between each other using communication framework 608. Communication framework 608 provides a unified application programming interface (API) to each of the subsystems. This unified interface allows any subsystem to send a message to any other subsystem, without regard for whether the subsystem reside in the same or in different memory spaces.

Thus, for example, routing manager 618 may calculate a route through the network for a particular network connection. Routing manager 618 can then communicate this route information to signaling manager 616 so that signaling manager 616 can notify, using a signaling protocol such as RSVP-TE, other network elements in the network that their switching fabrics need to be updated in order to accommodate the connection along the connection fabric that was calculated by routing manager 618. Routing manager 618 may reside in one process, while signaling manager 616 resides in a separate process in a different memory space. Alternatively, routing manager 618 and signaling manager 616 may be threads that share a memory space. In yet another scenario, routing manager 618 may be executing on one processor, while signaling manager 616 executes on an entirely different processor. A major objective of communications framework 608 is that the same interface is used for initiating communication between subsystems, regardless of which of these scenarios actually takes place.

A number of advantages are associated with this approach. The different subsystems can reside on different processors, even software-incompatible processors, to allow for distributed operation and to allow the most suitable processor for a particular task to be used. For example, as route calculation is relatively computationally intensive, routing manager 618 might best be executed on a processor that is optimized for computational performance. On the other hand, link management is a very data-intensive operation, requiring rapid storage and retrieval of information. Thus, link manager subsystem 612 may run best on a processor that is optimized for data access.

The communication model described in FIG. 6 also allows for the level of integration between routing software and the underlying network element to be varied. For example, certain subsystems may be incorporated within the hardware of a physical network element, while other subsystems are offloaded onto external computing devices. The communication model depicted in FIG. 6, where subsystems may communicate without regard for the memory space or processor on which the subsystems reside, allows for a considerable flexibility in the degree of integration between Routing Engine software and network element hardware, since from the perspective of any individual subsystem, all other subsystems appear to be "local" with respect to that subsystem, as if all subsystems resided on a common bus.

As can also be seen from FIG. 6, transport mediation manager subsystem 622, equipment management mediation subsystem 624 and network management mediation subsystem 626 also reside on the bus-like communication mechanism provided by communication framework 608. Transport mediation manager subsystem 622, equipment management mediation subsystem 624, and network management mediation subsystem 626, thus, act as bridges or gateways between Routing Engine system domain 600 and transport system domain 602, equipment management domain 604, and network management domain 606, respectively. The fact that transport mediation manager subsystem 622, equipment management mediation subsystem 624, and network management mediation subsystem 626 reside in the bus-like communication space of Routing Engine system domain 600 means that the other subsystems in Routing Engine system domain 600 may communicate with the underlying network element hardware using a generic, platform-independent interface through a communication model in which each of transport system domain 602, equipment management domain 604, and network management domain 606 are accessible as if they were local to Routing Engine system domain 600. This decoupling of control plane subsystems from management and transport plane hardware and software allows the control plane subsystems to be deployed in a flexible manner or even modified, re-configured, replaced, or made to execute on a different hardware platform or platforms without having to replace, modify, or even reconfigure low-level software for communicating with the underlying network element hardware and software.

Figure 7:
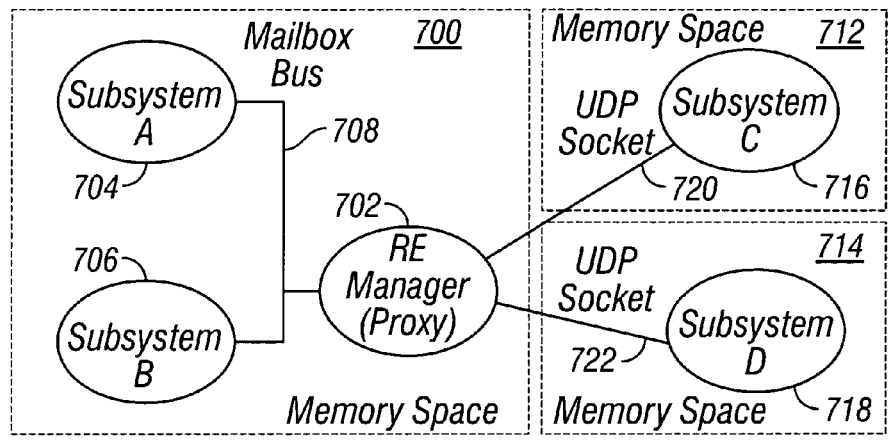
FIG. 7 is a diagram depicting the operation of a communication framework of a preferred embodiment of the present invention.

FIG. 7 is a diagram depicting the operation of communication framework 608 with regard to various Routing Engine software subsystems in accordance with the preferred embodiment of present invention. FIG. 7 shows a Routing Engine software package executing in three memory spaces 700, 712, and 714. Memory space 700 is called the "local" memory space, because is contains Routing Engine manager subsystem 702. Recall that Routing Engine manager subsystem 702 facilitates communication between subsystems, specifically between local subsystems and external subsystems (i.e., between subsystems residing in the local memory space and subsystems residing in external memory spaces). Local subsystems, such as subsystem 704 and subsystem 706, communicate via a shared memory. In a preferred embodiment of the present invention, the shared memory communication mechanism adopted for local subsystems is referred to as a mailbox bus 708.

Routing Engine manager subsystem 702 resides on mailbox bus 708. Routing Engine manager subsystem 702 acts as a proxy on the mailbox bus 708 for external subsystems 716 and 718. Communication between memory spaces is made through a socket interface. A socket interface is an application programming interface (API) for communicating between processes in a distributed or network computing system. In the preferred embodiment shown in FIG. 7, communication between memory space 700 and subsystem 716 in memory space 712 is made through a socket interface supporting User Datagram Protocol (UDP) (UDP Socket 720). UDP is also (perhaps more descriptively) referred to as "Unreliable Datagram Protocol" because under UDP, information is sent in small, individual messages (datagrams) which are sent from one process to another process without confirmation of whether the datagrams are received and without regard for the order in which the datagrams are received and processed by the recipient. UDP is defined in the IETF's RFC 768.

In a preferred embodiment of the present invention, a reliable transport protocol sits atop UDP. The reliable transport protocol allows for confirmation datagrams to be sent back to the sender of a datagram in order to ensure that the original datagram was sent correctly. The reliable transport protocol also supports breaking larger messages into smaller datagrams for transport, while attaching sequence numbers to the datagrams to allow the recipient to assemble the datagrams in the correct order to obtain the larger message. Although one of ordinary skill in the art will recognize that reliable connection-based transport protocols such as Transmission Control Protocol (TCP), defined in IETF RFC 793, may be used without UDP in the context of the present invention to provide reliable data transfer, a preferred embodiment of the present invention uses a lightweight reliable transport protocol providing packet sequencing and confirmations on top of UDP in order to avoid the overhead associated with connection-based protocols (e.g., handshaking).

Figure 8:
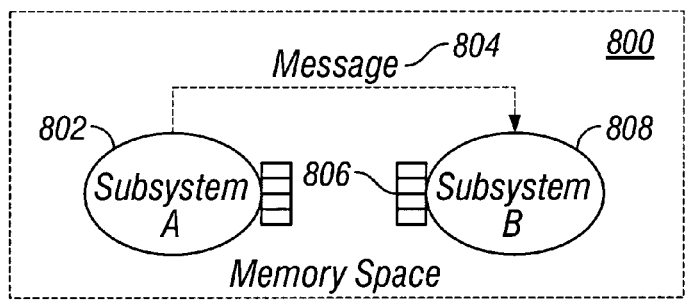
FIG. 8 is a diagram of a process of communication between two local subsystems in accordance with a preferred embodiment of the present invention.

FIGS. 8 thru 11 depict the operation of the communication scheme described in FIG. 7 in more detail. FIG. 8 is a diagram of a process of communication between two local subsystems in accordance with a preferred embodiment of the present invention. Memory space 800 is the local memory space. As was stated in conjunction with FIG. 7, the communication model for communication between local subsystems utilizes shared memory to pass messages between the subsystems. In a preferred embodiment, a "mailbox bus" scheme is used. FIG. 8 shows how this mailbox bus mechanism operates in a preferred embodiment of the present invention. Subsystem 802 and subsystem 808 are local subsystems that execute as threads within a process that also contains the Routing Engine manager subsystem. Each of the subsystems has an associated mailbox queue. For example, subsystem 808 is associated with mailbox queue 806 for inter-process communications (IPC). Mailbox queue 806 is a data structure in which messages are inserted and removed for processing in a first-in-first-out "FIFO" scheme. Alternatively, an IPC mailbox (i.e., a data structure for receiving messages from other threads) could be implemented using a different data structure, such as a circular buffer, a priority queue, a priority heap, a stack, a linked list, or any other suitable data structures as known in the art.

In the scenario depicted in FIG. 8, in which local subsystems communicate between themselves, the message sending subsystem, in this case subsystem 802, uses the communication framework system's application programming interface (API) to initiate the transfer of a message. Note that subsystem 802 does not specify whether the intended recipient subsystem is local or external when initiating the message transfer via the communication framework API. The communication framework code consults Routing Engine manager subsystem 702 (FIG. 7) to determine the memory space in which the recipient subsystem, in this case subsystem 808, resides. Each subsystem registers itself as external or local with the communication framework. Each subsystem is assigned a unique, well known identifier called a SAP (Service Access Point) that is broadcast to the other subsystems when registering with Routing Engine manager subsystem 702 and that is maintained by the communication framework API in each subsystem. Recall from the discussion of FIG. 4D that Routing Engine manager subsystem (reference symbol 466 in the UML diagram in FIG. 4D) is responsible for process management function 436 (i.e., the establishment of the processes and threads making up the various subsystems of the Routing Engine software). Thus, Routing Engine manager subsystem 702 is aware of the memory spaces in which each of the subsystems resides. Having determined that recipient subsystem 808 is a local subsystem just like sending subsystem 802, the communication framework then uses shared memory to transfer the message (message transfer 804) to subsystem 808. Since subsystem 808's mailbox queue 806 resides within the same memory space as subsystem 802, the communication framework code (which is incorporated into subsystem 802) simply inserts the message into mailbox queue 806. Subsystem 808 then removes the message when it appears at the head of mailbox queue 806 and reads the information from the message.

Figure 9:
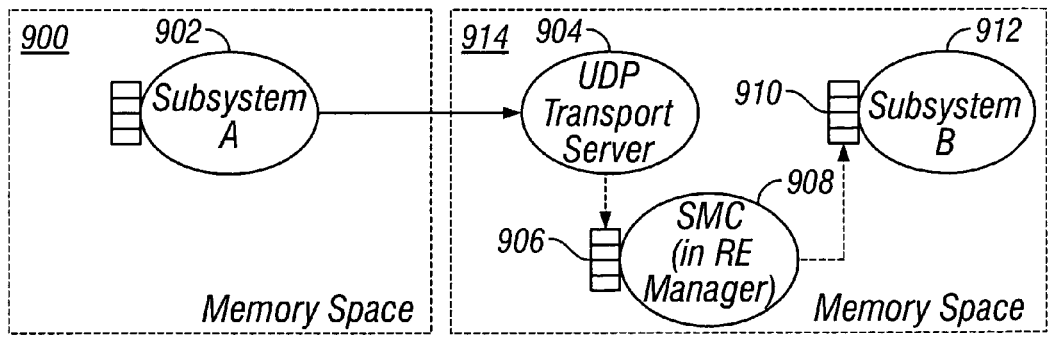
FIG. 9 is a diagram depicting a process of sending a message from an external subsystem to a local subsystem in accordance with a preferred embodiment of the present invention.

FIG. 9 is a diagram depicting a process of sending a message from an external subsystem to a local subsystem in accordance with a preferred embodiment of the present invention. In FIG. 9, memory space 900 is an external memory space, and memory space 914 is the local memory space, because it contains Routing Engine manager subsystem 702. Note that in FIG. 9 a system message coordinator (SMC) 908, which is a sub component of Routing Engine manager subsystem 702, is shown as being present in local memory space 914. System message coordinator 908 performs the proxy functions of Routing Engine manager subsystem 702 with respect to message transfers between local memory space 914 and an external memory space such as memory space 900.

Subsystem 902, an external subsystem, initiates the transfer of a message in FIG. 9. Because subsystem 902 is an external subsystem, it does not share a memory space with the intended recipient local subsystem 912. Thus, the communication framework code incorporated into subsystem 902 will transfer the message via the aforementioned reliable transport protocol operating over UDP. A UDP transport server thread 904 associated with Routing Engine manager subsystem 702 executes in memory space 914 to receive messages sent via the reliable transport protocol and UDP. Thus, subsystem 902 sends its message using the reliable transport protocol and UDP to the network address of UDP transport server 904. Recall from FIG. 3B, that in a preferred embodiment, the various processors used for supporting Routing Engine software are linked via LAN hardware 324. Thus, the address of UDP transport server 904 is the network address with respect to LAN hardware 324 in FIG. 3B.

Once UDP transport server 904 has received the message via socket interface transfer from subsystem 902 using the reliable transport protocol and UDP, UDP transport server 904 will insert the message in a mailbox queue 906 associated with system message coordinator 908. Since UDP transport server 904 and system message coordinator 908's mailbox queue 906 reside in the same memory space (local memory space 914), this insertion of the message in mailbox queue 906 is a shared memory operation. Once system message coordinator 908 removes the message from mailbox queue 906, system message coordinator 908 inserts the message in mailbox queue 910, which is associated with the intended recipient subsystem, subsystem 912. This is a simple shared memory operation, since system message coordinator 908 and subsystem 912 both reside in local memory space 914.

Figure 10:
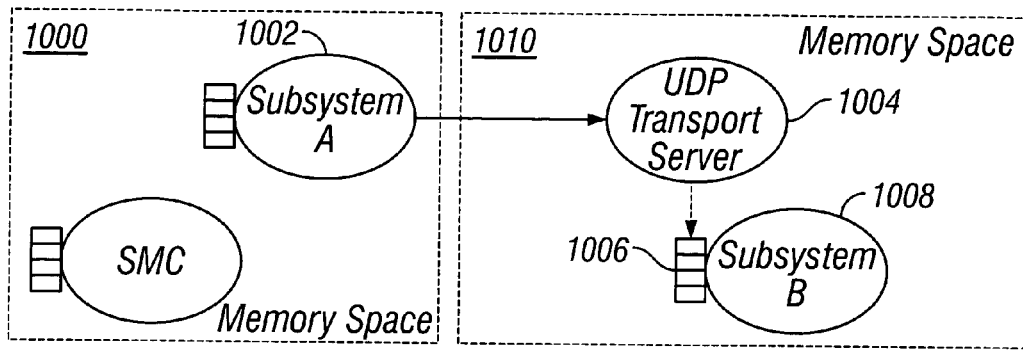
FIG. 10 is a diagram depicting a process of sending a message from a local subsystem to an external subsystem in accordance with a preferred embodiment of the present invention.

FIG. 10 is a diagram depicting a process of sending a message from a local subsystem to an external subsystem in accordance with a preferred embodiment of the present invention. In FIG. 10, memory space 1000 is the local memory space and memory space 1010 is an external memory space. Subsystem 1002 initiates the message transfer through the communication framework API by issuing a request to send a message. This request contains no information regarding whether the intended recipient of the message is an external or local subsystem. The communication framework code incorporated in the subsystem 1002 consults Routing Engine manager subsystem 702 to determine the memory space in which the intended recipient subsystem, subsystem 1008, resides. Once the communication framework code incorporated in the subsystem 1002 has determined that intended recipient subsystem 1008 resides in external memory space 1010, the communication framework code sends the message via the reliable transport protocol and UDP over a socket interface to a UDP transport server 1004 associated with memory space 1010. UDP transport server 1004, which resides in the same memory space as subsystem 1008, inserts the message into mailbox queue 1006, which is associated with subsystem 1008.

Figure 11:
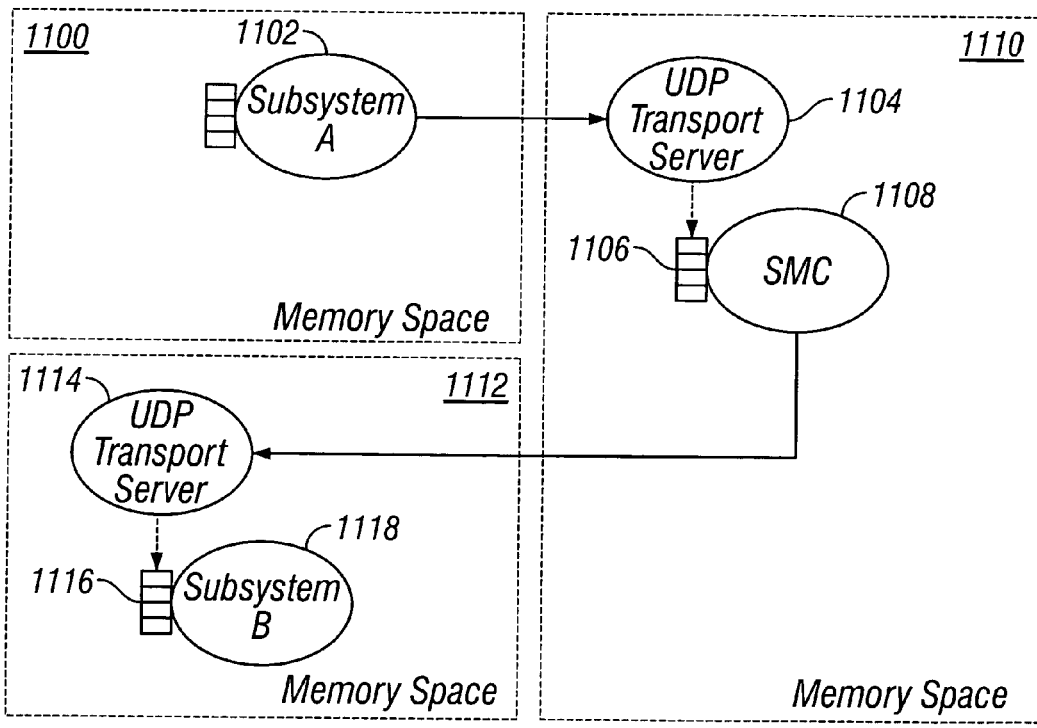
FIG. 11 is a diagram depicting a process of communication between two external subsystems in different memory spaces in accordance with a preferred embodiment of the present invention.

FIG. 11 is a diagram depicting a process of communication between two external subsystems in different memory spaces in accordance with a preferred embodiment of the present invention. In FIG. 11, subsystem 1102, which resides in external memory space 1100, needs to send a message to subsystem 1118, which resides in external memory space 1112. The process depicted in FIG. 11 is a combination of the processes described in FIGS. 9 and 10. Subsystem 1102 sends the message over a socket interface using the reliable transport protocol and UDP to UDP transport server 1104, which is associated with system message coordinator 1108 in local memory space 1110. UDP transport server 1104 inserts the received message into mailbox queue 1106, which is associated with system message coordinator 1108. System message coordinator 1108, recognizing that recipient subsystem 1118 resides in external memory space 1112, relays the message via a socket interface, using the reliable transport protocol and UDP, to UDP server 1114, which is associated with memory space 1112. UDP transport server 1114 then inserts the received message unto mailbox queue 1116, which is associated with subsystem 1118.

Figure 12:
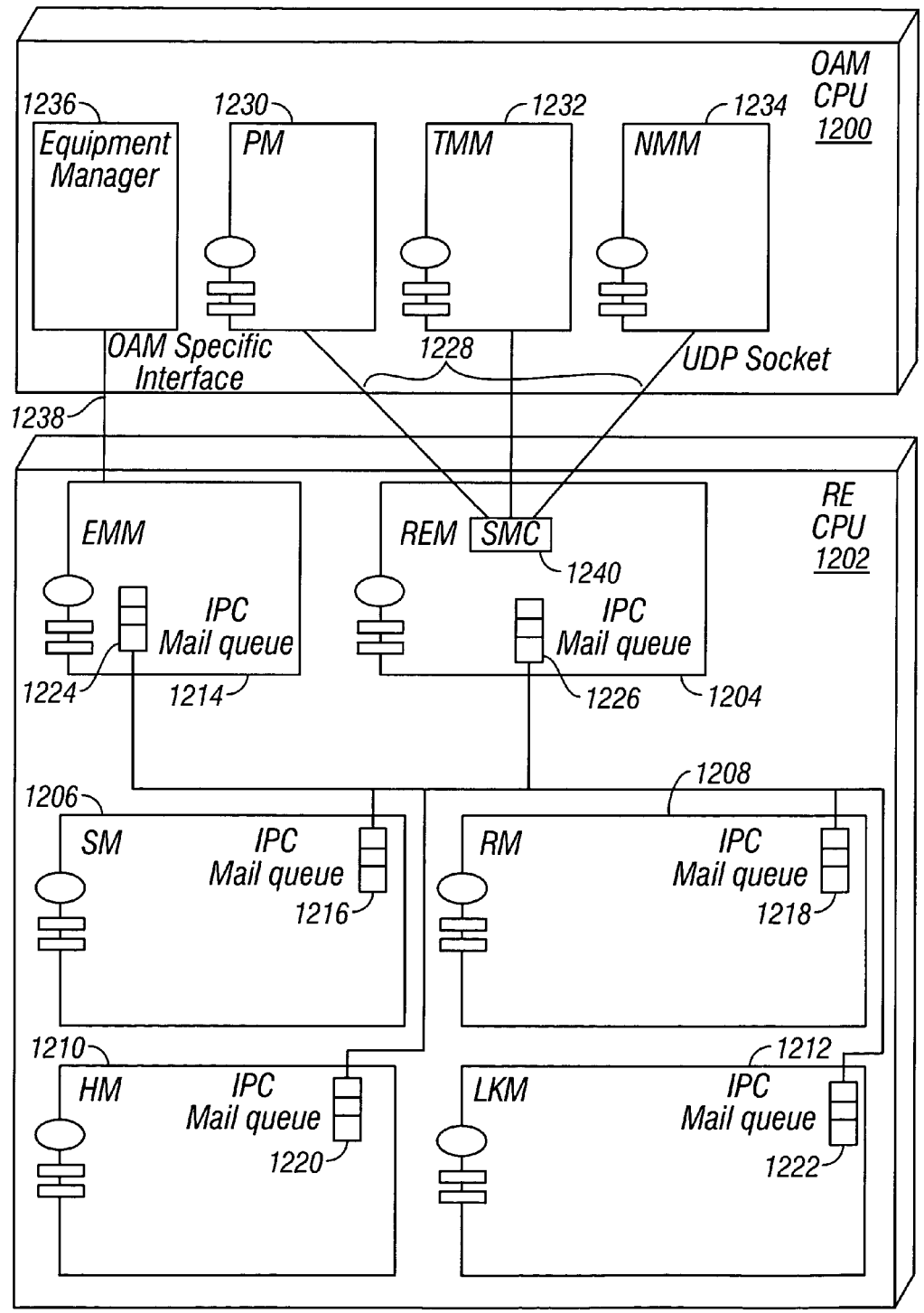
FIG. 12 is a diagram depicting an overall view of a preferred embodiment of the present invention in which Routing Engine software is distributed over a two processor hardware platform, such as that described in FIG. 3B.

FIG. 12 is a diagram depicting an overall view of a preferred embodiment of the present invention in which Routing Engine software is distributed over a two processor hardware platform, such as that described in FIG. 3B. In this embodiment, OAM (Operation and Administration Manager) CPU 1200 is used to perform low-level interactions with network element hardware. Routing Engine (RE) CPU 1202, on the other hand, is used to support control plane functions. Routing Engine manager 1204 resides on RE CPU 1202, thereby making RE CPU 1202 the local processor. In this preferred embodiment, Routing Engine manager subsystem 1204 and the other subsystems residing on RE CPU 1202, namely signaling manager subsystem 1206, routing manager subsystem 1208, high availability manager subsystem 1210, link manager subsystem 1212, and equipment management mediation subsystem 1214, are threads that share a common memory space. Thus, the subsystems residing on RE CPU 1202 may communicate by passing messages to each other's mailbox queues (mailbox queues 1216-1226, even numbers).

OAM CPU 1200 supports persistency manager subsystem 1230, transport mediation manager subsystem 1232, and network management mediation subsystem 1234, which in this preferred embodiment are separate processes, each having its own memory space. These subsystems communicate with local subsystems and with each other through system message coordinator 1240, which is part of Routing Engine manager 1204. This inter-CPU communication is performed via socket interfaces 1228, which support the aforementioned reliable transport protocol operating over UDP.

In this preferred embodiment, OAM CPU 1200 is tightly integrated into the network element hardware. Thus, OAM CPU 1200 also supports an equipment manager process 1236, which handles basic equipment management operations with respect to the network element as a whole. Equipment management mediation subsystem 1214, thus, communicates with equipment manager process 1236 through a network element native interface 1238.

A significant result of this preferred embodiment and its associated relationships among subsystem and processors is that the more computationally intense control plane operations are offloaded onto RE CPU 1202, which may or may not be external to the actual physical network element, while lower level functions are performed on OAM CPU 1200, which is tightly integrated into the network element hardware. Having persistency manager 1230 reside on OAM CPU 1200 adds an extra degree of data protection (over, e.g., the embodiment described with respect to FIG. 5), because OAM CPU 1200 may still be operational and may still contain needed persistent data stored by persistency manager 1230, even in the event that RE CPU 1202 fails. This would allow for a simpler recovery from failure of RE CPU 1202. One of ordinary skill in the art, however, will recognize that the flexible communication framework and software architecture provided by the present invention allow for many different arrangements of software subsystems with respect to processors and that the embodiment described in FIG. 12 is merely an example.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A computer-based method comprising:
    executing a plurality of network element control subsystems associated with a network element, wherein each of the network element control subsystems executes as one of a thread and a process and wherein a first subset of the plurality of network element control subsystems executes in a first memory space and a second subset of the plurality of network element control subsystems executes in a second memory space;
    receiving a request from a first network element control subsystem through an application programming interface to send a message to a second network element control subsystem, wherein the request is indifferent to which memory space the second network element control subsystem resides in;
    in response to receiving the request, determining whether the second network element control subsystem resides in a different memory space from the first network element control subsystem;
    in response to a determination that the second network element control subsystem resides in a different memory space from the first network element control subsystem, sending the message to the second network element control subsystem via a socket interface;
    in response to a determination that the second network element control subsystem resides in a same memory space as the first network element control subsystem, sending the message to the second network element control subsystem via shared memory.

2. The method of claim 1, wherein the plurality of network element control subsystems includes at least one of a routing subsystem that calculates routing paths, a signaling subsystem that provides switching information to other network elements, a link management subsystem that maintains information regarding physical links associated with the network element, a high availability subsystem that manages fault tolerance of the network element, a transport mediation subsystem that controls data transport in the network element, a network management mediation subsystem that interfaces the network element to network management software, and an equipment management subsystem that provides an interface to equipment management software executing on the network element.

3. The method of claim 1, wherein the first memory space and the second memory space are associated with separate processors.

4. The method of claim 1, wherein sending the message to the second network element control subsystem via shared memory includes writing the message to a mailbox queue associated with the second network element control subsystem.

5. The method of claim 1, wherein the plurality of network element control subsystems includes a manager subsystem that resides in the first memory space and wherein the manager subsystem receives messages from memory spaces other than the first memory space on behalf of destination network element control subsystems and relays the messages to the destination network element control subsystems.

6. The method of claim 5, wherein the destination network element control subsystems reside in the first memory space and the manager subsystem relays the messages via shared memory.

7. The method of claim 5, wherein the destination network element control subsystems reside in memory spaces other than the first memory space and the manager subsystem relays the messages via the socket interface.

8. The method of claim 1, wherein the socket interface transmits messages as datagrams.

9. The method of claim 1, wherein each network element control subsystem executes as a separate thread.

10. The method of claim 1, wherein each network element control subsystem executes as a separate process.

11. The method of claim 1, wherein the plurality of network control subsystems forms a control plane of a generalized multi-protocol label-switching (GMPLS) router.

12. A computer program product in a computer-readable medium, the computer program product comprising functional descriptive material that, when executed by a computer, enables the computer to perform acts including:
    executing a plurality of network element control subsystems associated with a network element, wherein each of the network element control subsystems executes as one of a thread and a process and wherein a first subset of the plurality of network element control subsystems executes in a first memory space and a second subset of the plurality of network element control subsystems executes in a second memory space;

receiving a request from a first network element control subsystem through an application programming interface to send a message to a second network element control subsystem, wherein the request is indifferent to which memory space the second network element control subsystem resides in;

in response to receiving the request, determining whether the second network element control subsystem resides in a different memory space from the first network element control subsystem;

in response to a determination that the second network element control subsystem resides in a different memory space from the first network element control subsystem, sending the message to the second network element control subsystem via a socket interface;

in response to a determination that the second network element control subsystem resides in a same memory space as the first network element control subsystem, sending the message to the second network element control subsystem via shared memory.

13. The computer program product of claim 12, wherein the plurality of network element control subsystems includes at least one of a routing subsystem that calculates routing paths, a signaling subsystem that provides switching information to other network elements, a link management subsystem that maintains information regarding physical links associated with the management subsystem that maintains information regarding physical links associated with the network element, a high availability subsystem that manages fault tolerance of the network element, a transport mediation subsystem that controls data transport in the network element, a network management mediation subsystem that interfaces the network element to network management software, and an equipment management subsystem that provides an interface to equipment management software executing on the network element.

14. The computer program product of claim 12, wherein the first memory space and the second memory space are associated with separate processors.

15. The computer program product of claim 12, wherein sending the message to the second network element control subsystem via shared memory includes writing the message to a mailbox queue associated with the second network element control subsystem.

16. The computer program product of claim 12, wherein the plurality of network element control subsystems includes a manager subsystem that resides in the first memory space and wherein the manager subsystem receives messages from memory spaces other than the first memory space on behalf of destination network element control subsystems and relays the messages to the destination network element control subsystems.

17. The computer program product of claim 16, wherein the destination network element control subsystems reside in the first memory space and the manager subsystem relays the messages via shared memory.

18. The computer program product of claim 16, wherein the destination network element control subsystems reside in memory spaces other than the first memory space and the manager subsystem relays the messages via the socket interface.

19. The computer program product of claim 12, wherein the socket interface transmits messages as datagrams.

20. The computer program product of claim 12, wherein each network element control subsystem executes as a separate thread.

21. The computer program product of claim 12, wherein each network element control subsystem executes as a separate process.

22. The computer program product of claim 12, wherein the computer readable medium is incorporated into the network element.

23. The computer program product of claim 12, wherein the plurality of network control subsystems forms a control plane of a generalized multi-protocol label-switching (GMPLS) router.

24. A data processing system for a network element, the data processing system comprising:
at least one processor;
memory; and
a set of instructions,
wherein the at least one processor executes the set of instructions to perform the following acts:
executing a plurality of network element control subsystems defined by the set of instructions, wherein each of the network element control subsystems executes as one of a thread and a process and wherein a first subset of the plurality of network element control subsystems executes in a first memory space and a second subset of the plurality of network element control subsystems executes in a second memory space;

receiving a request from a first network element control subsystem through an application programming interface to send a message to a second network element control subsystem, wherein the request is indifferent to which memory space the second network element control subsystem resides in;

in response to receiving the request, determining whether the second network element control subsystem resides in a different memory space from the first network element control subsystem;

in response to a determination that the second network element control subsystem resides in a different memory space from the first network element control subsystem, sending the message to the second network element control subsystem via a socket interface;

in response to a determination that the second network element control subsystem resides in a same memory space as the first network element control subsystem, sending the message to the second network element control subsystem via shared memory.

25. The data processing system of claim 24, wherein the plurality of network element control subsystems includes at least one of a routing subsystem that calculates routing paths, a signaling subsystem that provides switching information to other network elements, a link management subsystem that maintains information regarding physical links associated with the network element, a high availability subsystem that manages fault tolerance of the network element, a transport mediation subsystem that controls data transport in the network element, a network management mediation subsystem that interfaces the network element to network management software, and an equipment management subsystem that provides an interface to equipment management software executing on the network element.

26. The data processing system of claim 25, further comprising:
network hardware, wherein the network hardware switches data in a network.

27. The data processing system of claim 26, wherein the plurality of network element control subsystems includes the transport mediation subsystem and the transport mediation subsystem interfaces other network element control subsystems to the network hardware.

28. The data processing system of claim 26, wherein the network hardware includes at least one of an optical cross-connect, a digital cross-connect, and an add-drop multiplexer.

29. The data processing system of claim 26, wherein the network hardware includes hardware for circuit-switched routing.

30. The data processing system of claim 24, wherein the data processing system is incorporated into the network element.

31. The data processing system of claim 24, wherein at least a portion of the data processing system is external to the network element.

32. The data processing system of claim 24, wherein the first memory space and the second memory space are associated with separate processors.

33. The data processing system of claim 24, wherein sending the message to the second network element control subsystem via shared memory includes writing the message to a mailbox queue associated with the second network element control subsystem.

34. The data processing system of claim 24, wherein the plurality of network element control subsystems includes a manager subsystem that resides in the first memory space and wherein the manager subsystem receives messages from memory spaces other than the first memory space on behalf of destination network element control subsystems and relays the messages to the destination network element control subsystems.

35. The data processing system of claim 34, wherein the destination network element control subsystems reside in the first memory space and the manager subsystem relays the messages via shared memory.

36. The data processing system of claim 34, wherein the destination network element control subsystems reside in memory spaces other than the first memory space and the manager subsystem relays the messages via the socket interface.

37. The data processing system of claim 24, wherein the socket interface transmits messages as datagrams.

38. The data processing system of claim 24, wherein each network element control subsystem executes as a separate thread.

39. The data processing system of claim 24, wherein each network element control subsystem executes as a separate process.

40. The data processing system of claim 24, wherein the at least one processor includes a plurality of processors, wherein the plurality of processors communicate via local area network (LAN) hardware, and wherein the socket interface transmits data through the local area network hardware.

41. The data processing system of claim 24, wherein the plurality of network control subsystems forms a control plane of a generalized multi-protocol label-switching (GMPLS) router.

* * * * *